United States Patent [19]
Wagner et al.

[11] Patent Number: 5,398,952
[45] Date of Patent: Mar. 21, 1995

[54] LIFTABLE AMUSEMENT RIDE CARRIER

[76] Inventors: Charles E. Wagner; James E. Wagner, both of 1 Wilcox Ave., P.O. Box 666, Center Moriches, N.Y. 11934

[21] Appl. No.: 12,530

[22] Filed: Feb. 2, 1993

[51] Int. Cl.[6] .............................................. B62D 61/12
[52] U.S. Cl. .............................. 280/43.24; 280/414.5; 280/766.1; 104/137
[58] Field of Search .............. 280/763.1, 765.1, 766.1, 280/43.24, 424.5, 656; 104/137; 410/3

[56] References Cited

U.S. PATENT DOCUMENTS

| | | | |
|---|---|---|---|
| 2,277,900 | 3/1942 | Ball | 280/763.1 X |
| 2,297,992 | 10/1942 | Swim | 280/33.4 |
| 2,560,625 | 7/1951 | Boggs, Jr. et al. | 280/414.5 X |
| 2,648,546 | 8/1953 | Falkenhagen | 280/43.23 X |
| 2,771,303 | 11/1956 | Frazier | 280/104.5 |
| 2,774,606 | 12/1956 | Burweger et al. | 280/414.5 |
| 3,536,339 | 10/1970 | Fichtenberg | 280/414.5 |
| 3,697,098 | 10/1972 | Fisher | |
| 4,003,583 | 1/1977 | Stanzel | 280/43.24 X |
| 4,326,594 | 4/1982 | Oka et al. | 172/328 |
| 4,886,290 | 12/1989 | Pourchon et al. | 280/704 |
| 4,900,055 | 2/1990 | Wright | 280/704 |
| 5,137,297 | 8/1992 | Walker | 280/414.5 |
| 5,161,814 | 11/1992 | Walker | 280/414.5 |
| 5,249,532 | 10/1993 | Perrot | 104/137 X |

FOREIGN PATENT DOCUMENTS

| | | | |
|---|---|---|---|
| 220576 | 9/1958 | Australia | 410/3 |
| 2434051 | 4/1980 | France | 280/43.24 |
| 2560489 | 3/1984 | France | |
| 63-232082 | 9/1988 | Japan | |
| 2194925 | 3/1988 | United Kingdom | |
| 2204537 | 11/1988 | United Kingdom | |

*Primary Examiner*—Brian L. Johnson
*Attorney, Agent, or Firm*—Alfred M. Walker

[57] ABSTRACT

A carrier is provided for transporting a carnival ride track and carnival vehicle, without the necessity of dismantling and removing the vehicle from the track during transportation. In the use of the carrier, a carnival vehicle, such as a toy train, remains elevated during highway transportation of the carrier. A section of amusement ride track, is incorporated into a trestle portion. When in use, the carrier lowers the track to the ground so that the carnival vehicle, such as a toy train for carrying passengers, can move about a designated track configuration, such as a "figure eight" track design. The carrier includes a retractable suspension system designed to lower the trailer holding the track completely to the ground level, and to raise it for travel over the road.

2 Claims, 9 Drawing Sheets

LIFTABLE AMUSEMENT RIDE CARRIER

The present invention refers to a liftable amusement ride carrier, or trailer, according to the following description. More specifically, the invention refers to a carrier for transporting a carnival ride track and carnival vehicle, without the necessity of dismantling and removing the vehicle from the track during transportation. In fact, by virtue of the present invention, the carnival vehicle, such as a toy train or the like, remains elevated during transportation up on a section of the track, which track is incorporated into a trestle portion or the like. When in use, the present invention lowers the track to the ground so that the carnival vehicle, such as a toy train for carrying passengers, can move about a designated track configuration, such as a "figure eight" track design.

The present invention includes a retractable suspension system designed to lower the trailer holding the track completely to ground level, and to raise it for travel over the road.

The suspension system is retracted with hydraulic retractors retracted, placing the wheel fenders of the trailer to ground level with the chassis. When the hydraulic cylinders are extended, the trailer is raised and made road ready by removing one or more removable fasteners, such as grade 8 bolts, on either side of the cylinders.

The frame has three useful positions relative to the road suspension assembly. One such position is the road-ready position, in which the frame is ready to be transported on public highways. In a second position, the frame is in a fully ascended position relative to the road suspension assembly. In the second position, the frame is supported by a lifting mechanism, generally comprised of at least one conventional lifting jack. The frame's third position relative to the road suspension assembly is the fully descended position, wherein the frame assembly is ready for use as an amusement ride, and cannot be transported since it is not supported by the road wheels, but rather, is disposed upon the ground as are the road wheels.

The suspension system comprises two channels, a frame channel and an axle channel. Each respective channel permits vertical motion independent of the other. The frame vertical motion channel is for allowing the frame to ascend and descend from one of its three positions relative to the road suspension assembly to another such relative position. The axle channel permitting vertical motion permits a sprung plate to move vertically while the frame and road suspension assembly, which bears an axle, are in transport on public highways. The sprung plate has a bore therethrough for accommodating and fixedly holding in place a short axle, the axle being for a road wheel. There are two short axles, and thus two road wheels on each side of the road suspension assembly, there being four short axles in total for a given road suspension assembly. There is no necessary limit on the number of road suspension assemblies which can be provided on a given highway trailer.

The sprung plate with its attached axle, and, by mechanical connection, the highway wheel, are all permitted to move vertically within the axle channel.

BACKGROUND OF THE PRIOR ART

Various suspension systems have been used to lower a trailer or agricultural structure at or near the ground, utilizing hydraulic lifters. However, these systems have complicated lifting mechanisms with more movable parts, such as rotatable rocker arms, which are subject to uneven stresses in use.

Among the United States patents are the following:

| | |
|---|---|
| 5,161,814 of Walker | 3,697,098 of Fisher |
| 5,137,297 of Walker | 3,536,339 of Fichtenberg |
| 4,900,055 of Wright | 2,771,303 of Frazier |
| 4,886,290 of Pourchon | 2,297,992 of Swim |
| 4,326,594 of Oka | |

U.S. Pat. Nos. 5,137,297 of Walker and 5,161,814, also of Walker, disclose trailerable structures with retractable towing hardware, including complicated rocker arms.

U.S. Pat. No. 4,900,055 of Wright discloses a hydraulic retractable and extensible wheel suspension, with through axles, which has rocker arms, has complicated levers and links, and which can't be lowered all the way to the ground.

U.S. Pat. Nos. 4,326,594 of Oka and 3,536,339 of Fichtenberg disclose raising and lowering mechanisms for farm implements with complicated rotatable rocker arms.

U.S. Pat. No. 2,297,992 of Swim discloses the vertical adjustment of a frame with complicated scissors jacks, and which can't be completely lowered to the ground.

U.S. Pat. No. 2,771,303 of Frazier describes a conventional wheel suspension system with leaf springs, which does not lower to the ground, and U.S. Pat. No. 3,697,098 of Fisher discloses a coupling device for a mobile home which does not lower to the ground.

U.S. Pat. No. 4,886,290 of Pourchon describes a complicated device with hydraulic lifers encompassing rotatable links and rocker arms.

British Patent GB2204537A of Ratcliffe discloses a temporary trailer having a box-like body wherein one end of the tow bar leaf spring is removed down adjacent to the ground by removing a cotter pin to lower the leaf spring to the ground. The rotation of the leaf spring presents uneven mechanical stress when lowering the trailer to the ground.

French Patent 2560-489-A of Lerin discloses a livestock transporter which is removable to the ground. However, it appears to be removable by rocking arm 12, which is similar to the rocking arm mechanisms of the above noted U.S. patents.

British Patent, GB21949025A of Tomecek, discloses a lowerable trailer suspension system which, renders the wheels inoperative, so that they can be lowered to the ground with rotatable rocker arms.

Japanese Patent 63-232082(A) of Kawanami discloses a trailer system with complicated X-shaped links 3 which can be compressed for lowering the trailer to the ground.

OBJECTS OF THE INVENTION

It is an object of the present invention to provide a lowerable trailer suspension system, which can lower the trailer and its contents to the ground without the necessity of complicated rotating rocker arms.

The present invention overcomes the disadvantages of the prior art by eliminating the need for rotatable rocker arms, which are subject to uneven mechanical stresses when lowering the trailer to the ground. In fact, some of the prior art devices do not even lower the trailer completely to the ground, because of the structural configuration and limitations of the devices.

The present invention accomplishes the raising and lowering of the frame, having the carnival train tracks built therein, by providing raising and lowering motion which is strictly vertical and involves neither a horizontal component of motion nor a rotational motion of any kind. The advantage of doing so is that the present invention eliminates the need for rocker arms found in the prior art. Rocker arms used in prior art amusement vehicles uniformly suffer from the disadvantage that force is unevenly distributed on and about the rocker arm and its anchoring points, thus leading to excessive wear and early potential failure.

SUMMARY OF THE INVENTION

The liftable amusement ride track carrier, according to the invention, includes a frame structure, constructed of a plurality of steel beams. The majority of these steel members are used as cross ties and slanting supports, welded together to resemble a bridge trestle, of dimensions of approximately 36' in length, 8'6" in width, and 9' in height. This framework has a welded steel beam base, constructed so that a portion of the parallel rails and cross ties of an amusement ride track extends longitudinally within and is integrally contained within the base. This base functions as the base of the trailer and also functions as part of an amusement train ride, in which the train travels through the bridge trestle on the integrally contained track.

The steel frame has attached to each side two jack cylinders, with each such cylinder comprising a hydraulic cylinder such that, when extended, the four jacks will contact the ground and raise the frame into the air.

A chassis assembly is mounted on each side of the frame to permit use of the carrier as a mobile trailer. The chassis has a horizontally extending steel plate, which acts as a foundation for the chassis and is removably bolted to the side of the carrier frame by fasteners, such as three ¾" grade 8 steel bolts. Each side of the carrier has two steel tube and rod axles, with each axle suspended by, and partially surrounded by, U-shaped bolts, which are connected to a steel leaf spring. One end of the steel leaf spring is mounted on the steel plate and the other is attached to a restraining means, such as, preferably, a steel shackle, which is mounted centrally on the steel plate. A pair of steel guide bars, located on the steel plate so as to vertically extend on both sides of each axle, guide the vertical up and down motion of each axle and sprung steel plate. Each axle has a wheel rotatably mounted on it.

Each of the resulting four rotatable wheels is provided with a pneumatic tire and brake assembly, such as is generally known in the art for trailers. A fender, constructed of welded aluminum diamond plate material, is located on each steel plate, above the wheels, in order to protect the wheels.

The present invention results in the spring-like resilience of wheel movements and thereby provides the suspension for the vehicle, by having each axle connected to an elastic steel leaf spring, with the guide bars allowing only vertical elasticity of axle movement. This assembly provides shock absorption for each wheel. One should note that this carrier has no axle extending from one side to the other.

As noted above, six grade 8 bolts, placed on each side of the carrier, removably attaches each steel plate to the side of the carrier. Removal of the bolts frees the chassis from the frame, allowing the lowering of the frame to the ground.

The carrier, in its transport mode, is able to carry an amusement ride train and other components of a disassembled amusement ride in a compact form. This trailer is easily hauled by a pick-up truck. The four jack cylinders can be extended so that they lift and support the carrier and its wheels in the air. This release position allows the removal of the six bolts, enabling the chassis to separate from the frame and lower to the ground, similar to the manner in which an automobile is jacked up for removal of its wheels. Then, the jack cylinders are retracted, thus lowering the frame to the ground. These steps permit the quick conversion of the carrier into a part of the amusement ride at a temporary carnival site, without the necessity for preliminary unloading of the train or preliminary laying of tracks. In this position, the trailer functions as the trestle portion of the amusement ride, allowing the train to run through the frame on the track integrally contained within the frame.

The carrier can be prepared for transport by extending the jack cylinders to raise the frame and the chassis assemblies by the insertion of the grade 8 bolts. These steps quickly return the carrier to its trailering position, containing the train and all other components of the amusement ride. Thus, this invention provides the convenience of easily converting from a carrier to an integral part of the amusement ride, without the traditional inconvenience of requiring extra jacks or other parts, and without requiring the preliminary laying of tracks or unloading of the train. By functioning as a part of the amusement ride, the carrier saves both space and time in the set up, disassembly and transport of the ride to carnival sites.

DESCRIPTION OF THE DRAWINGS

In the following the invention will be further described with reference to the accompanying drawings, which illustrate by way of example a preferred embodiment of the liftable amusement ride carrier, or trailer, according to the invention. In the drawings.

Figure 1:
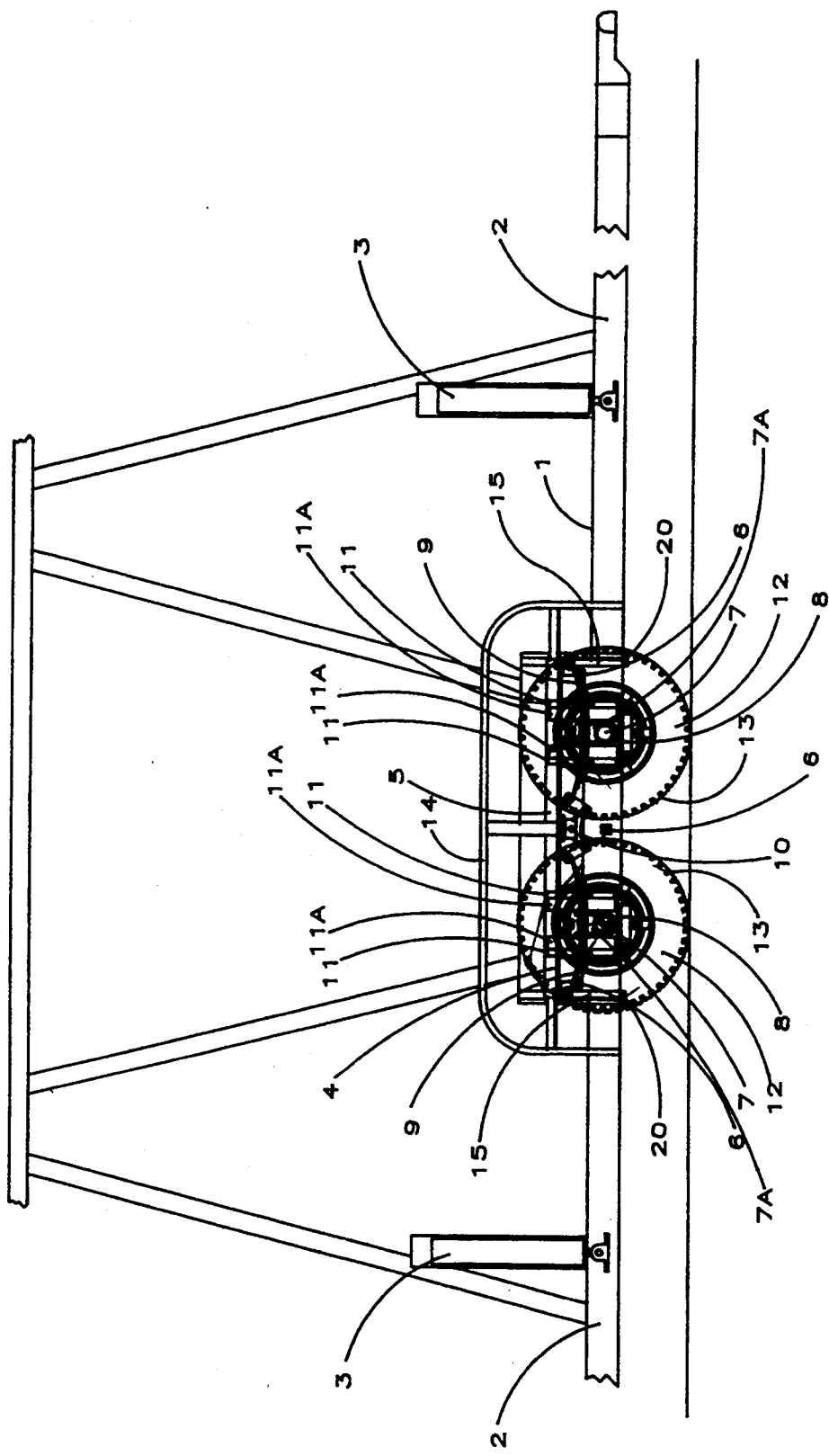
FIG. 1 is a side view of the carrier, in its transport position.

List of reference numerals—presented here merely to assist in understanding the structures and concepts of the present invention and not to be interpreted as limiting the application submitted herewith.
1. Frame
2. Base of Frame
3. Lifting means
4. Chassis assembly
5. Fixed Plate
6. Fixed Plate Fastener means
7. Axle
7A. Sprung Plate
7B. Channel guiding sprung plate
7C. Bore within sprung plate
8. Axle Fastener means
9. Energy storing device
10. Restraint means
11. Vertical guide, rear
11A. Vertical guide, front
12. Wheel
13. Tire
14. Fender
15. Restraining means comprising fixed plate channel
16. Channel guiding fixed plate
20. Stops restraining fixed plate
25. Amusement Vehicle

DETAILED DESCRIPTION

The liftable amusement ride track carrier, according to the invention, comprises a frame structure (1), constructed preferably of a plurality of steel beams. The majority of these steel members are used as cross ties and slanting supports, welded together to resemble a bridge trestle, of dimensions of approximately 36' in length, 8'6" in width, and 9' in height. This framework has a base, such as a welded steel beam base (2), constructed so that a portion of the parallel rails and cross ties of an amusement ride track extends longitudinally within and is integrally contained within the base (2). This base functions as the base of the trailer and also functions as part of an amusement train ride, in which the amusement ride vehicle (25), such as, preferably, an amusement railroad train, travels through the bridge trestle on the integrally contained track.

As shown in FIG. 1, the steel frame (1) has attached to each side at least one lifting mechanism, such as preferably a pair of jack cylinders (3), with each such cylinder comprising a hydraulic cylinder such that, when extended, the lifting mechanisms, such as preferably four jacks (3) will contact the ground and raise the frame (1) into the air.

Figure 9:
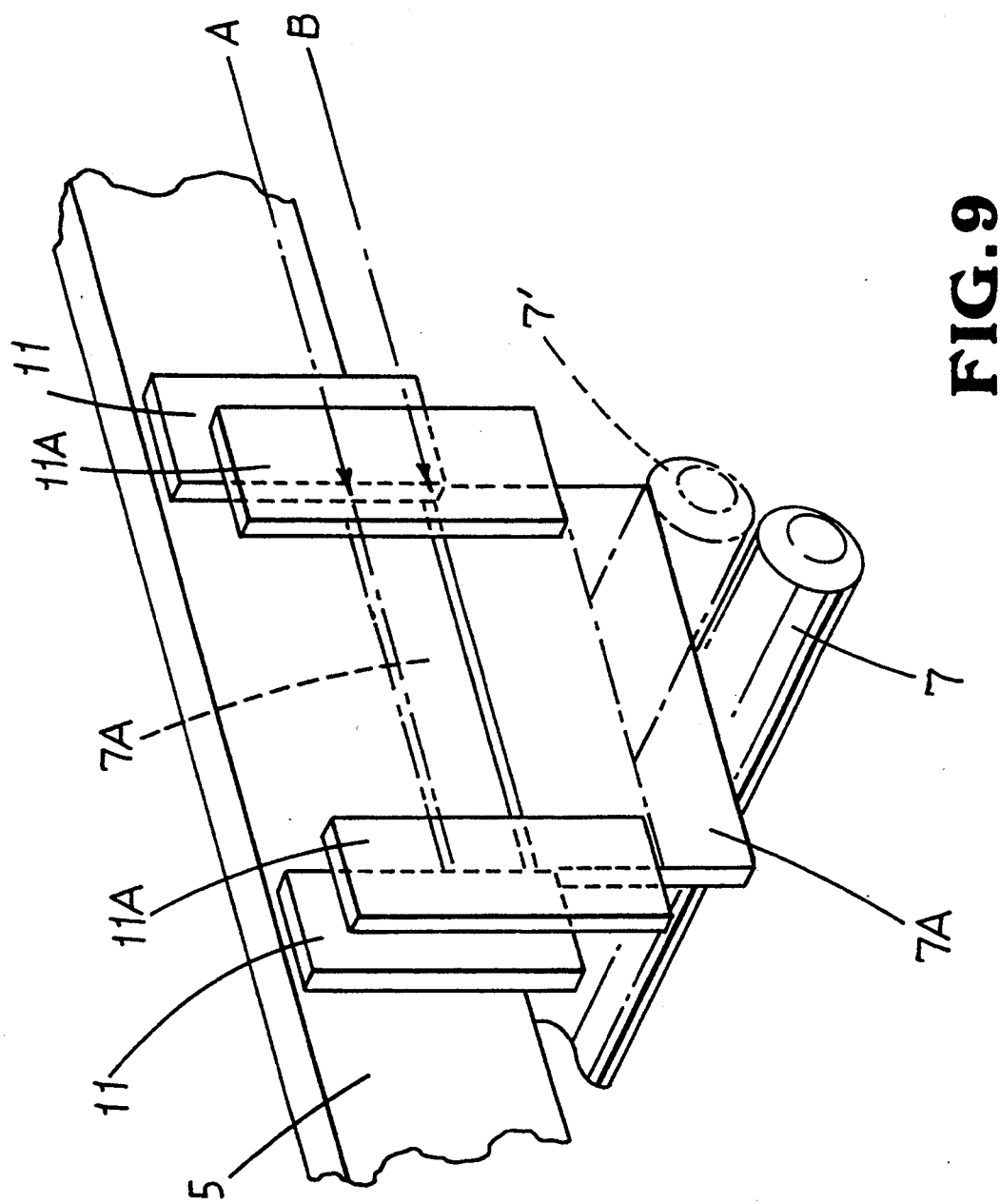
FIG. 9 is a close-up perspective view in partial section of each vertical sliding channel within which the sprung plate supporting each partial axles of the carrier moves vertically.

As also shown in FIG. 1, a chassis assembly (4) is mounted on each side of the frame (1) to permit use of the carrier as a mobile trailer for base (2) of frame (1), the base (2) containing travel means, such as, preferably, railroad tracks and cross ties for amusement ride vehicle (25). As detailed in FIG. 5, the chassis (4) has a horizontally extending plate member, such as preferably steel plate (5), which acts as a foundation for the chassis (4) and is removably attached, such as preferably by bolts, to the side of the carrier frame (1) by one or more fasteners such as preferably three ¾" grade 8 steel bolts (6). Each side of the carrier has two steel tube and rod axles (7), with each axle (7) suspended by, and partially surrounded by holding members, such as, preferably, U-shaped bolts (8), which are connected to an energy storage device, such as, preferably, a steel leaf spring (9). One end of the steel leaf spring (9) is mounted on the plate member, such as, preferably, steel plate (5) and the other is attached to a restraining member, such as, preferably, steel shackle (10), which is mounted centrally on the steel plate (5). As shown in FIG. 9, a pair of vertical movement guide means, such as, preferably, rear vertical steel guide bars (11), and front vertical steel guide bars (11A) located on the steel plate (5) so as to vertically extend on both sides of each axle (7), guide the vertical up and down motion of each axle (7) and sprung steel plate (7A) within channel 7C during highway transport. Channel 7C is formed between vertical guides 11A, rear vertical guides 11, and fixed plate 5. In FIG. 9, sprung support plate 7A for partial axle 7 is shown in a vertical position designated "B" and it is shown as 7A' in dotted lines in a further lifted vertical position designated "A". Likewise, partial axle 7 is shown in dotted lines as 7' in a lifted position. Each axle (7) has a wheel (12) rotatably mounted on it.

The frame (1) has three useful positions relative to the road suspension assembly, also called chassis (4). One such position is the road-ready position, in which the frame (1) is ready to be transported on public highways. In a second position, the frame (1) is in a fully ascended position relative to the road suspension assembly, also called chassis (4). In the second position, the frame (1) is supported by a lifting mechanism, such as, preferably, at least one conventional lifting jack (3). The third position of frame (1) relative to the road suspension assembly, also called chassis (4) is the fully descended position, wherein the frame (1) assembly is ready for use as an amusement ride, and cannot be transported since it is not supported by the road wheels, but rather, is disposed upon the ground as are the road wheels.

The suspension system comprises two channels, a frame channel (16) and an axle channel (7B). Each respective channel permits vertical motion independent of the other. The frame vertical motion channel (16) is for allowing the frame (1) to ascend and descend from one of its three positions relative to the road suspension assembly to another such relative position. The axle channel (7B) permitting vertical motion permits a sprung plate (7A) to move vertically while the frame (1) and road suspension assembly also called chassis (4), which bears an axle (7), are in transport on public highways. The sprung plate (7A) has a bore (7C) therethrough for accommodating and fixedly holding in place a short axle (7), the axle (7) being for a road wheel (12). There are two short axles (7), and thus two road wheels (12) on each side of the road suspension assembly, also called chassis (4), there being four short axles (7) in total for a given road suspension assembly, also known as chassis (4). There is no necessary limit on the number of road suspension assemblies, also chassis (4) which can be provided on a given highway trailer.

The sprung plate (7A) with its attached axle (7), and, by mechanical connection, the highway wheel (12), are all permitted to move vertically within the axle channel (7B).

Each of the resulting four rotatable wheels (12) is provided with a pneumatic tire (13) and brake assembly, such as is generally known in the art for trailers. A fender (14), constructed of welded aluminum diamond plate material, is located on each steel plate (5), above the wheels (12), in order to protect the wheels.

The above described wheel apparatus results in the spring-like resilience of wheel movements and thereby provides the suspension for the vehicle, by having each axle (7) connected to an elastic steel leaf spring (9), with the guide bars (11) allowing only vertical elasticity of axle (7) movement. This assembly provides shock absorption for each wheel (12). One should note that this carrier has no axle extending from one side to the other.

Figure 5:
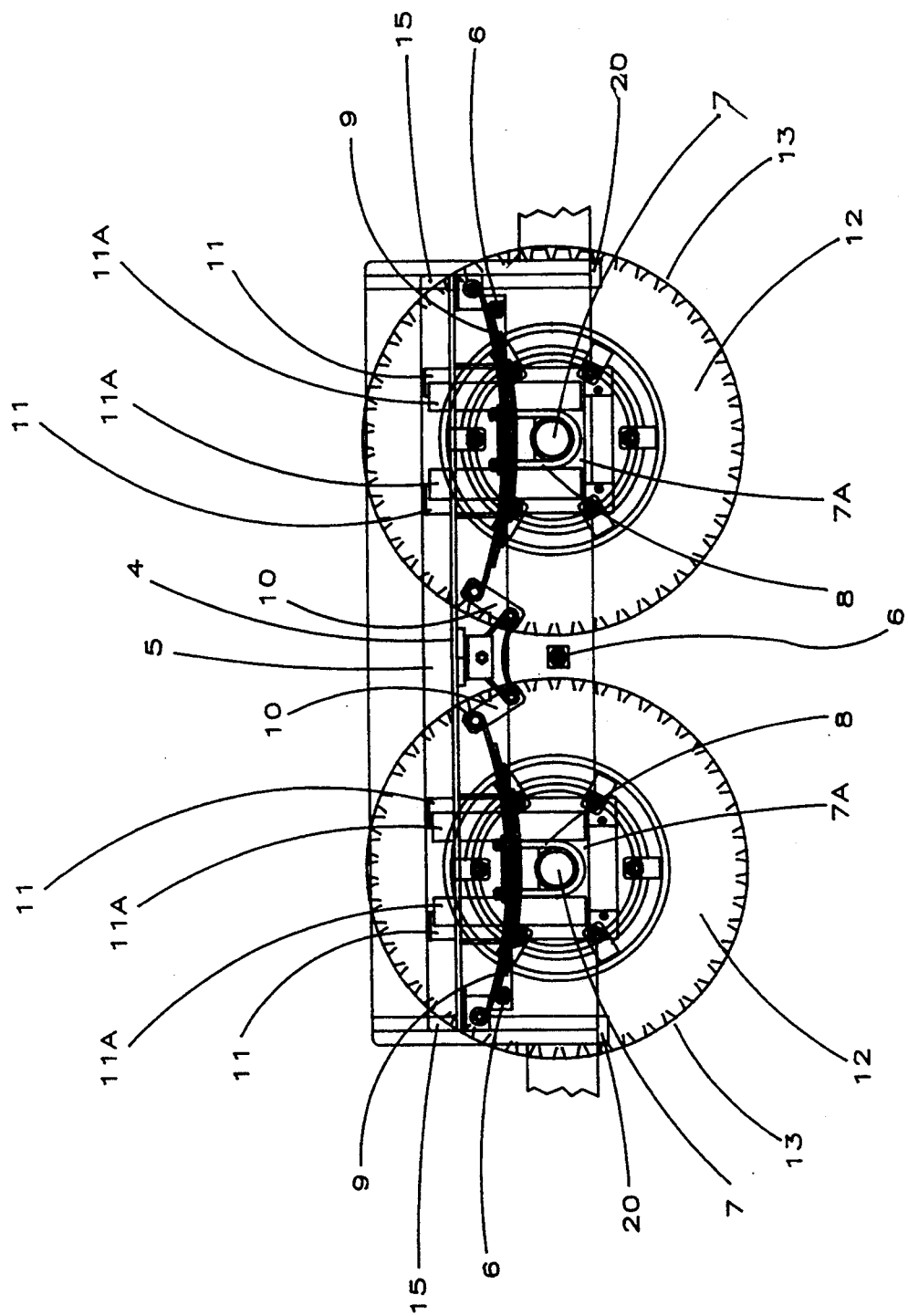
FIG. 5 is a fragmentary side view of the chassis and wheel assembly, showing suspension details.
Figure 6:
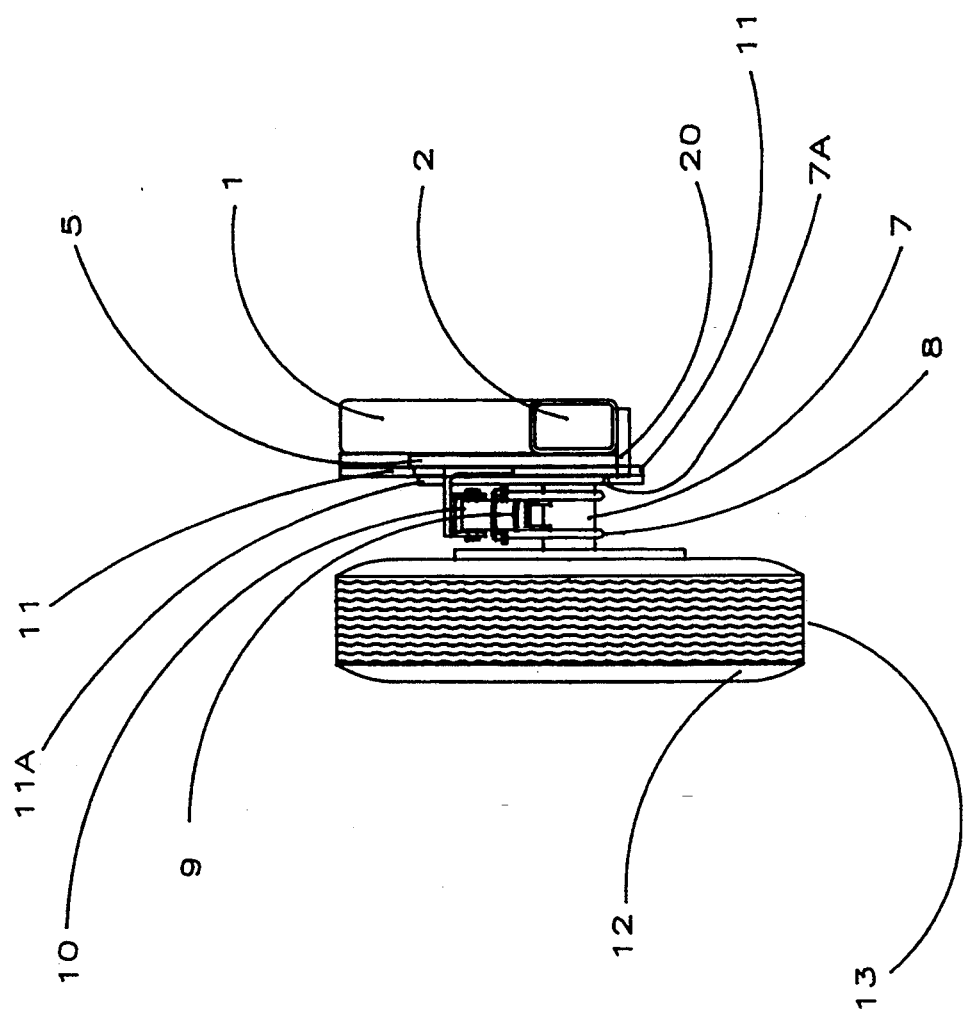
FIG. 6 is a fragmentary end view of the chassis and wheel assembly.
Figure 7:
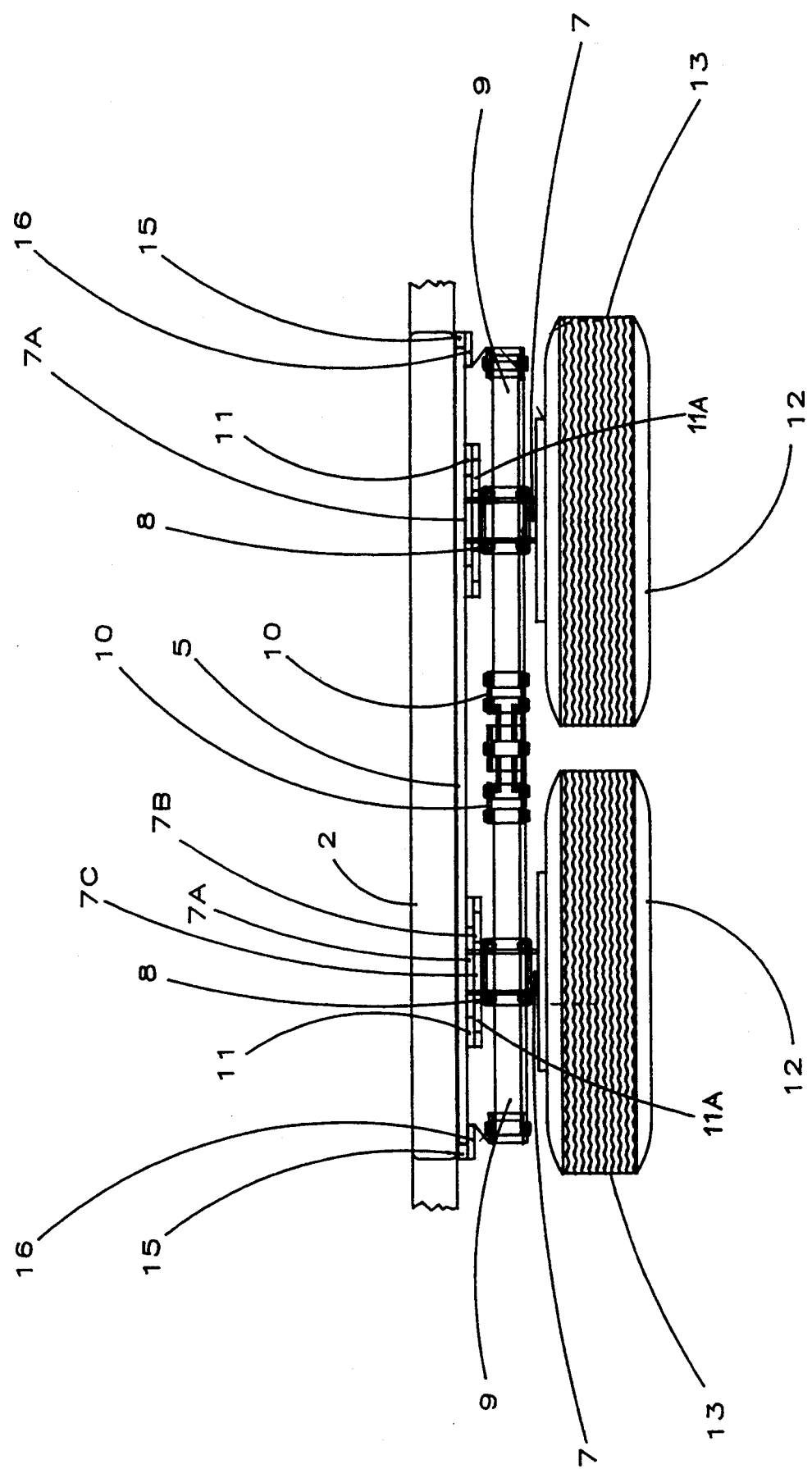
FIG. 7 is a fragmentary top view of the chassis and wheel assembly.
Figure 8:
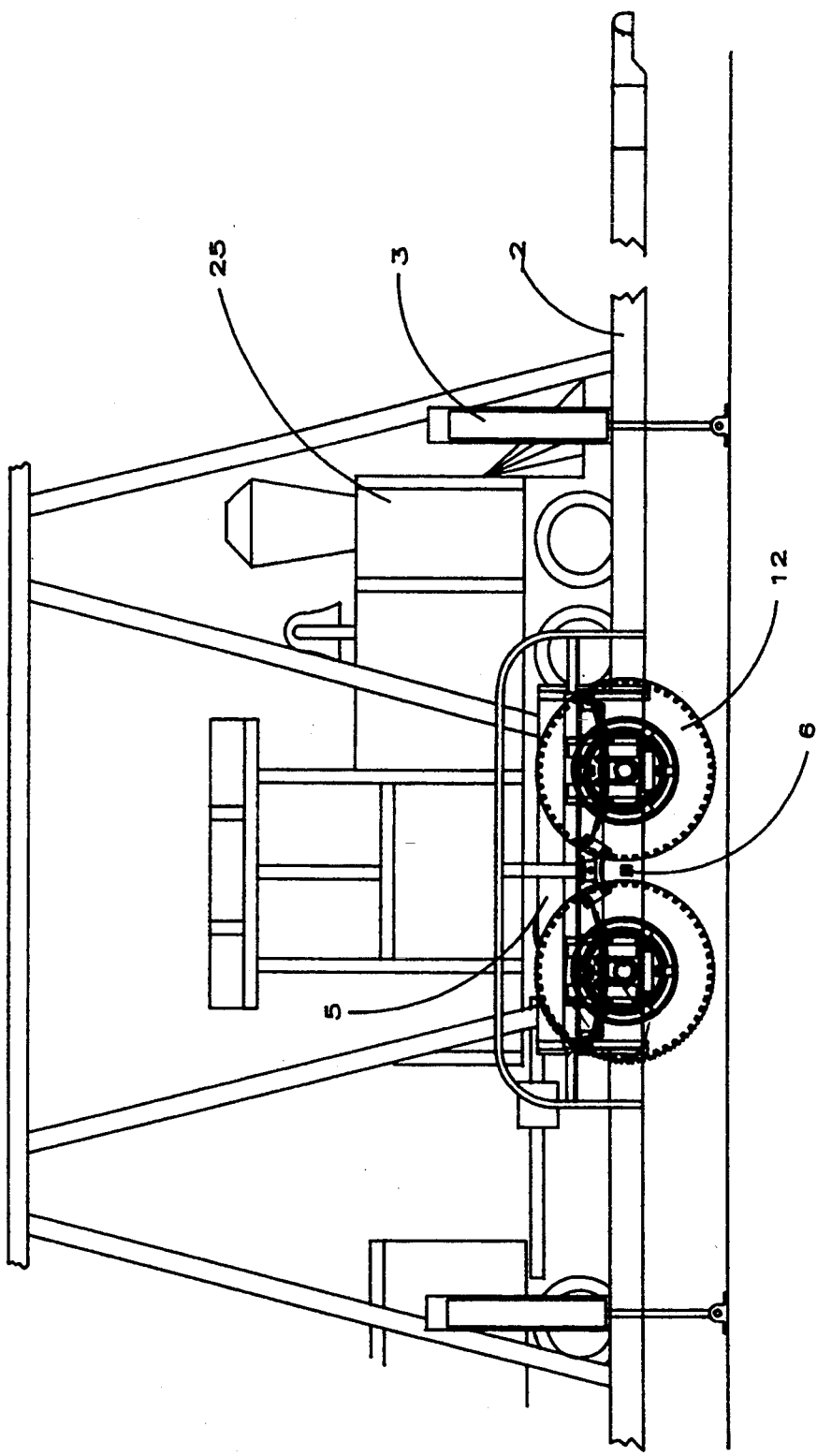
FIG. 8 is a side elevational view of the carrier in a raised position, showing a carnival vehicle thereon.

As noted above, six grade 8 bolts (6), placed in the locations shown in FIG. 5 on each side of the carrier, removably attaches each steel plate (5) to the side of the carrier. Removal of the bolts (6) frees the chassis (4) from the frame (1), allowing the lowering of the frame (1) to the ground. When the bolts (6) are removed, the plate (5) is retained in place by a pair of stops (20) fixedly disposed on either side of frame (1). One or more retaining guide means, such as, preferably, a pair of L-bars (15) serve as retaining means and comprise a vertical motion guide channel for the fixed plate (5).

Figure 2:
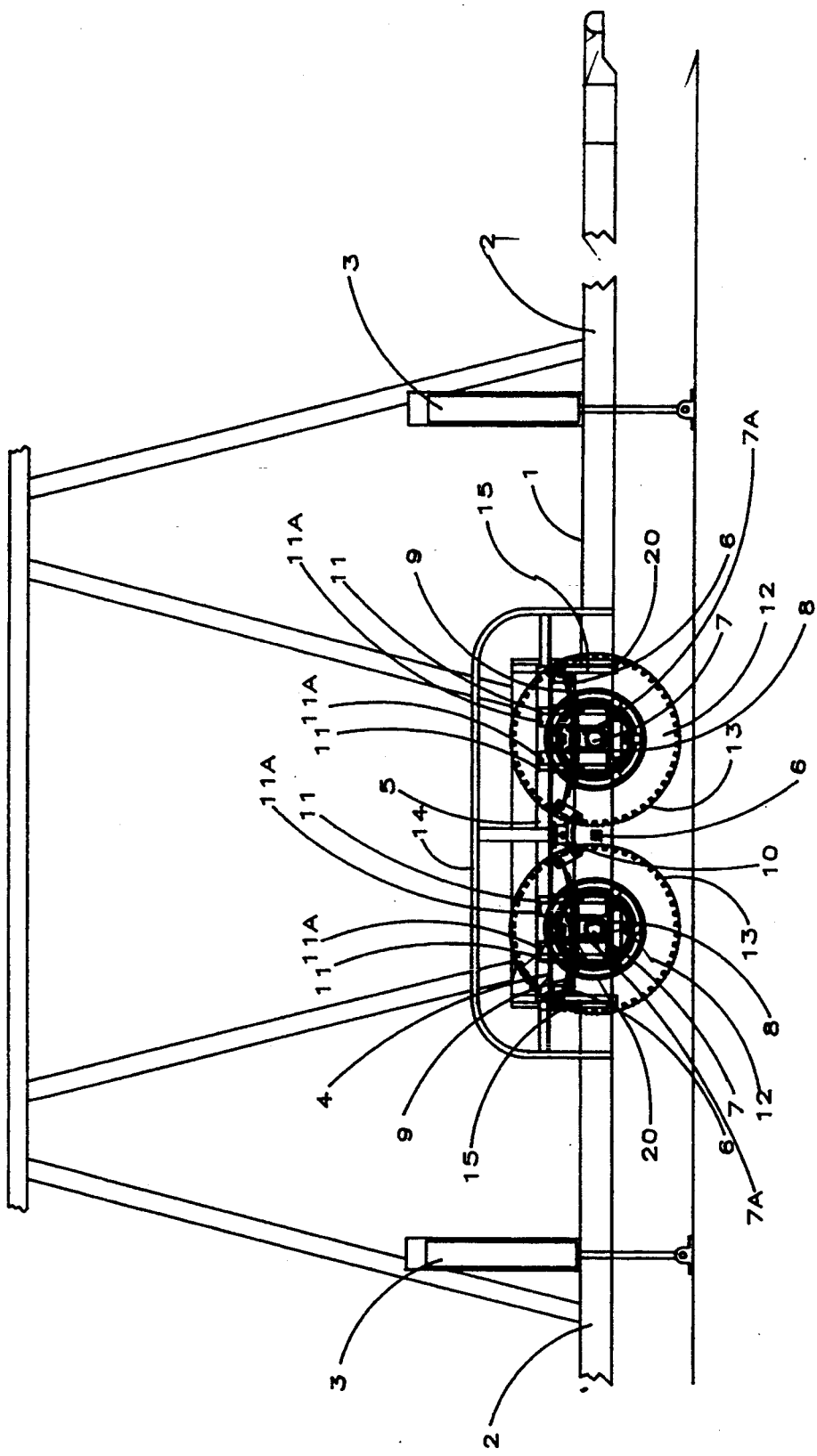
FIG. 2 is a side view of the carrier in its raised, release position.
Figure 3:
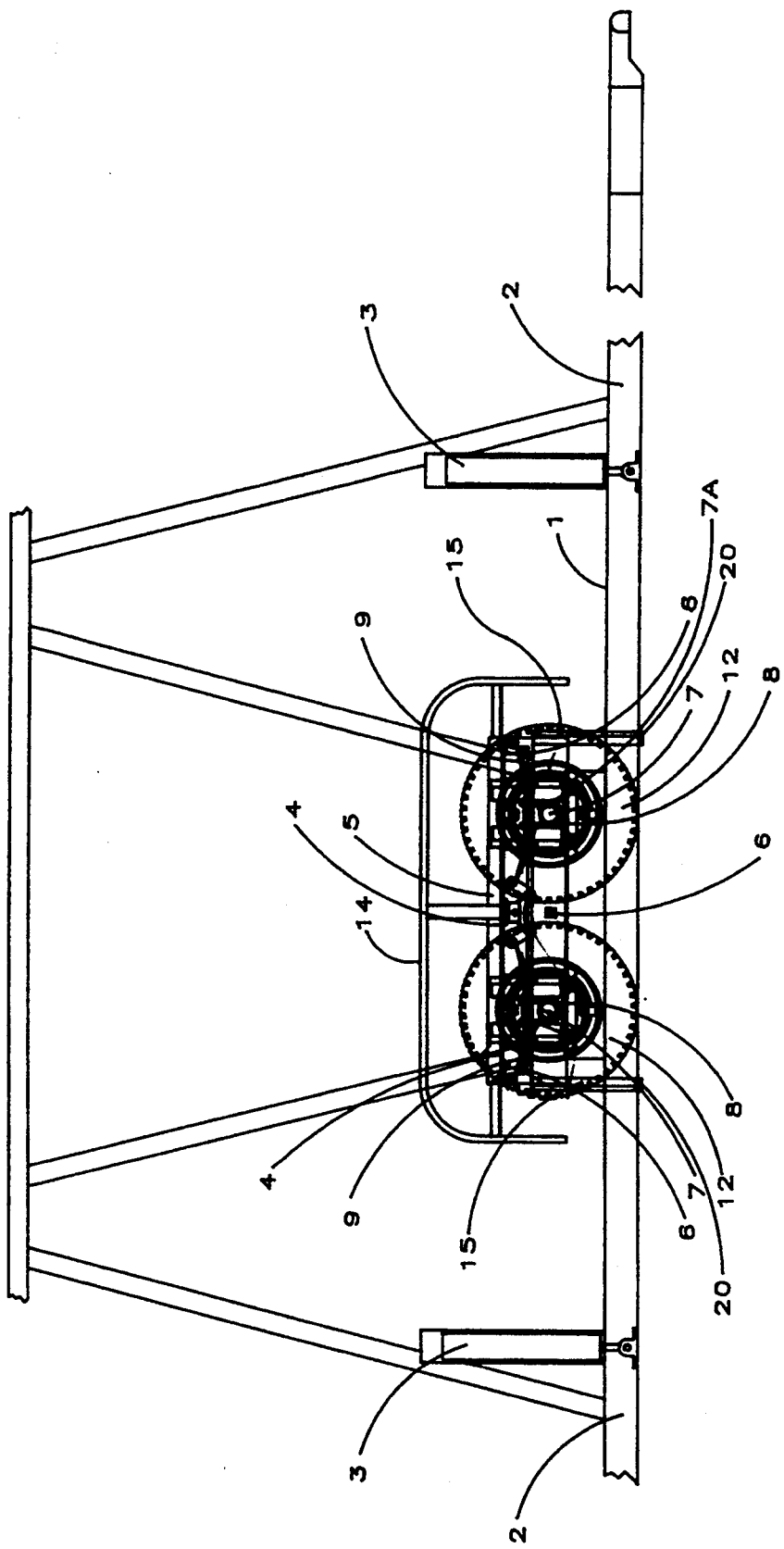
FIG. 3 is a side view of the carrier lowered to the ground, in its carnival use position.
Figure 4:
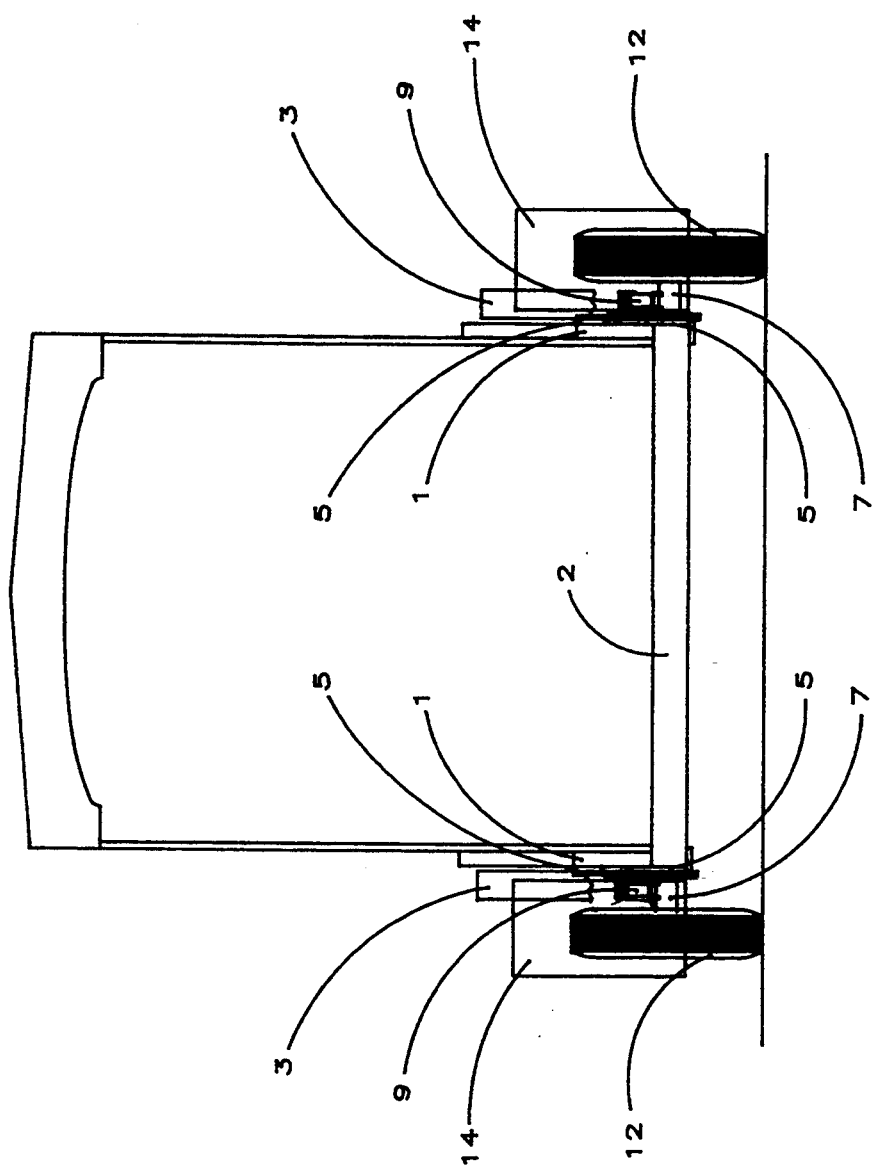
FIG. 4 is an end view of the carrier in its transport position.

FIG. 1 shows the carrier in its transport mode, able to carry an amusement ride train and other components of a disassembled amusement ride in a compact form. This trailer is easily hauled by a pick-up truck. As illustrated in FIG. 2, the four jack cylinders (3) can be extended so that they lift and support the carrier and its wheels (12) in the air. This release position allows the removal of the fasteners, such as, preferably, six bolts (6), enabling the chassis (4) and fixed plate (5) to separate from the frame (1) so that frame (1) can lower to the ground, similar to the manner in which an automobile is jacked up for removal of its wheels. Then, the jack cylinders (3) are retracted, thus lowering the frame (1) to the ground, as shown in FIG. 3. These steps permit the quick conversion of the carrier into a part of the amusement ride at a temporary carnival site, without the necessity for preliminary unloading of the train or preliminary laying of tracks. In this position, the trailer functions as the trestle portion of the amusement ride, allowing the train to run through the frame (1) on the track integrally contained within the frame (1).

The carrier can be prepared for transport by extending the jack cylinders (3) to raise the frame (1) and the chassis assemblies (4) by the insertion of the grade 8 bolts (6). These steps quickly return the carrier to its trailering position, containing the train and all other components of the amusement ride. Thus, this invention provides the convenience of easily converting from a carrier to an integral part of the amusement ride, without the traditional inconvenience of requiring extra jacks or other parts, and without requiring the preliminary laying of tracks or unloading of the train. By functioning as a part of the amusement ride, the carrier saves both space and time in the set up, disassembly and transport of the ride to carnival sites.

The above description has shown a particular form of the embodiment of the invention. However, I am aware that many minor changes therein will readily suggest themselves to others skilled in the art without departing from the spirit and scope of the invention, as noted in the appended Claims.

I claim:

1. A liftable amusement ride carrier, for transporting an amusement ride vehicle and ride guide means, comprising:
    a frame structure, constructed of a plurality of beams, said beam members arranged and suitably attached to each other in a frame bridge trestle,
    a base providing a trailer for supporting said amusement ride vehicle, wherein said amusement ride vehicle travels through said frame bridge trestle on said guide means,
    said frame structure having attached to each side at least one lifting means, said lifting means responsive to raising and lowering said frame in a strictly vertical motion,
    a chassis assembly mountable on each side of said frame;
    said chassis assembly having a horizontally extending foundation plate, said foundation plate removably attached to a side of said carrier frame structure by at least one suitable fastening means;
    each side of said carrier having partial stub axles extending through a portion of said carrier, each said partial stub axle fixedly attached by means of an axle restraining means, the axle restraining means being connected to an energy storing device;
    said energy storing device mountable on said foundation plate and simultaneously attachable to a restraining means, mountable on said foundation plate;
    at least one movable sprung support plate supporting each said partial stub axle;
    a pair of guide bars, located on said foundation plate, said guide bars defining a vertical channel therebetween, said guide bars located on both sides of said vertical channel, said guide bars guiding the vertical up and down motion of each said partial stub axle and said sprung plate within each said vertical channel, each said partial stub axle having a wheel rotatably mounted on said partial stub axle;
    wherein said foundation plate is vertically movable relative to said frame structure, said vertically movable foundation plate being guided by a frame vertical motion channel, said frame vertical motion channel being integrally attached to said frame structure; said frame structure and said foundation plate being provided with respective bores therethrough for accommodating said fastening means; said respective bores being in positional register when said fastening means are applied thereto.

2. The device of claim 1, wherein said fastening means is at least one bolt, said restraining means is a shackle, said energy storing device is a leaf spring and said axle restraining means is a U-shaped bolt.

* * * * *